Figure 1:
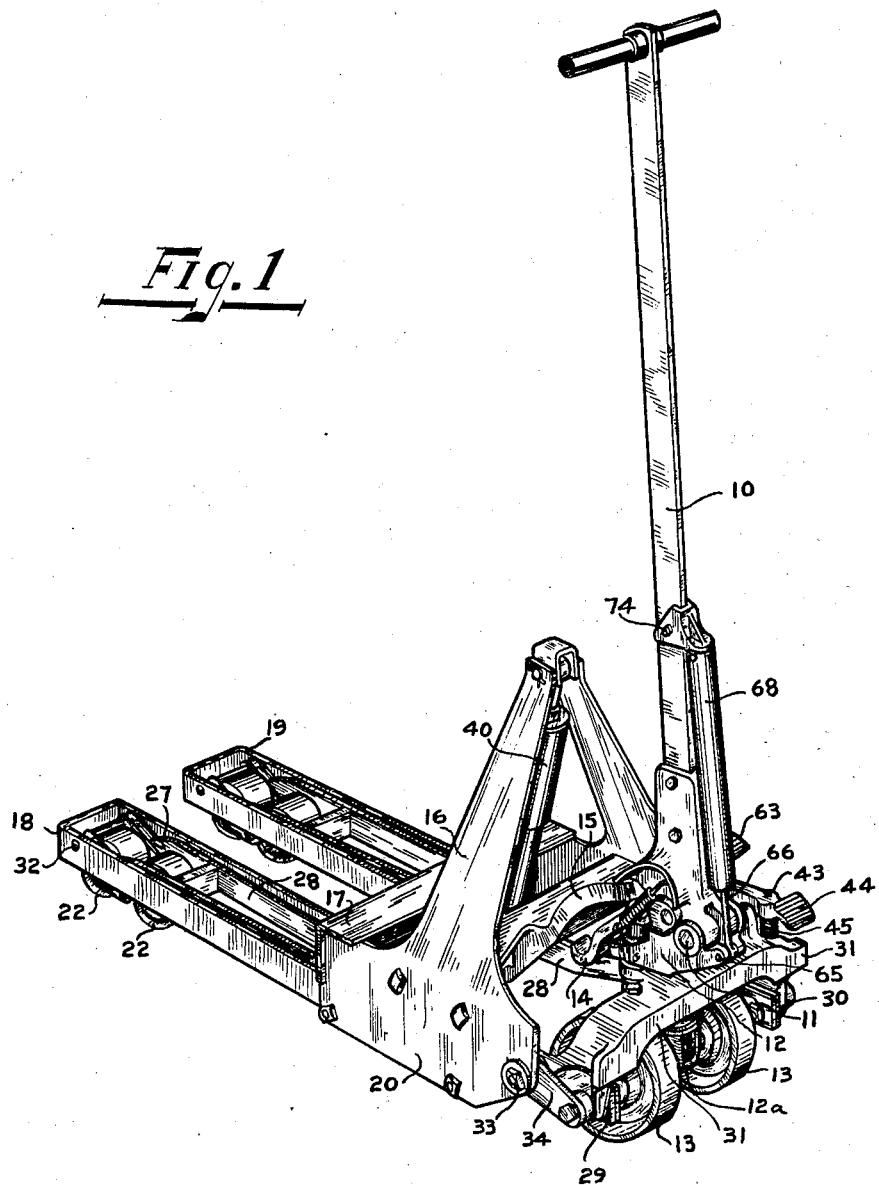

Sept. 14, 1937. G. QUAYLE 2,093,392
LIFTING TRUCK
Original Filed Oct. 26, 1933 3 Sheets-Sheet 1

INVENTOR
George Quayle
ATTORNEY

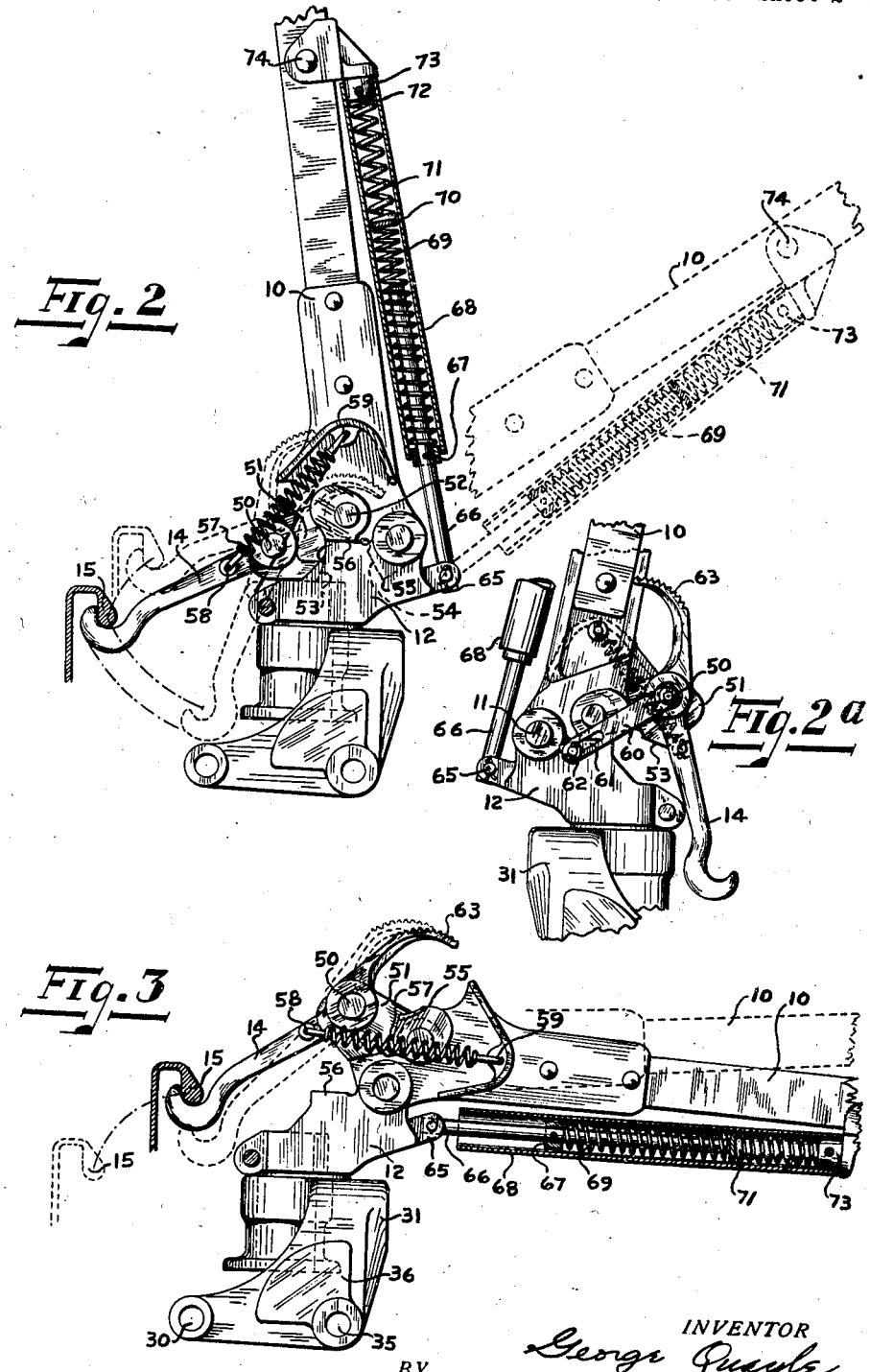

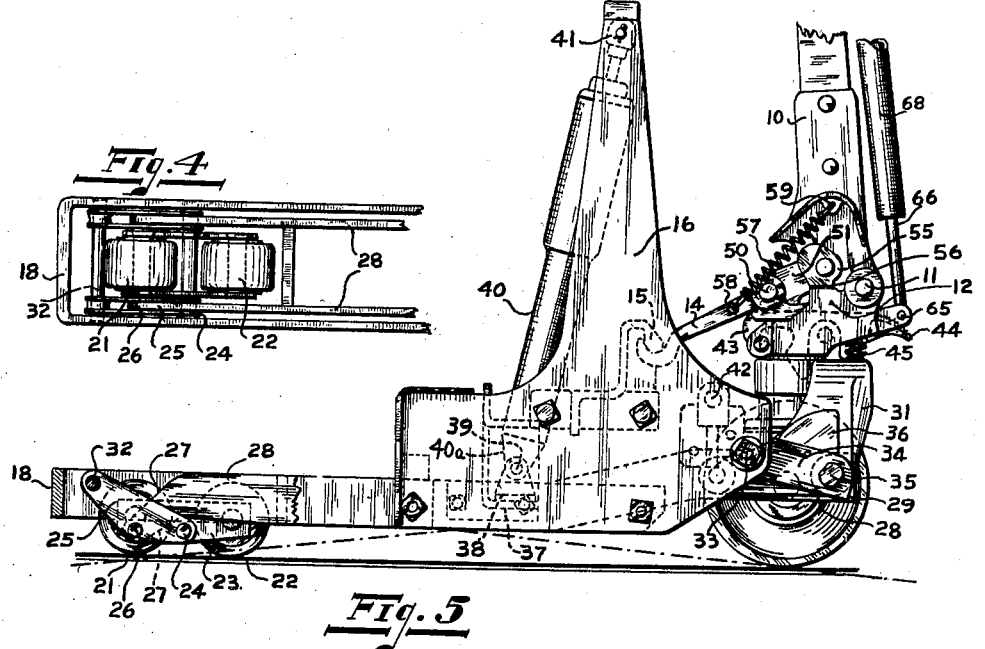
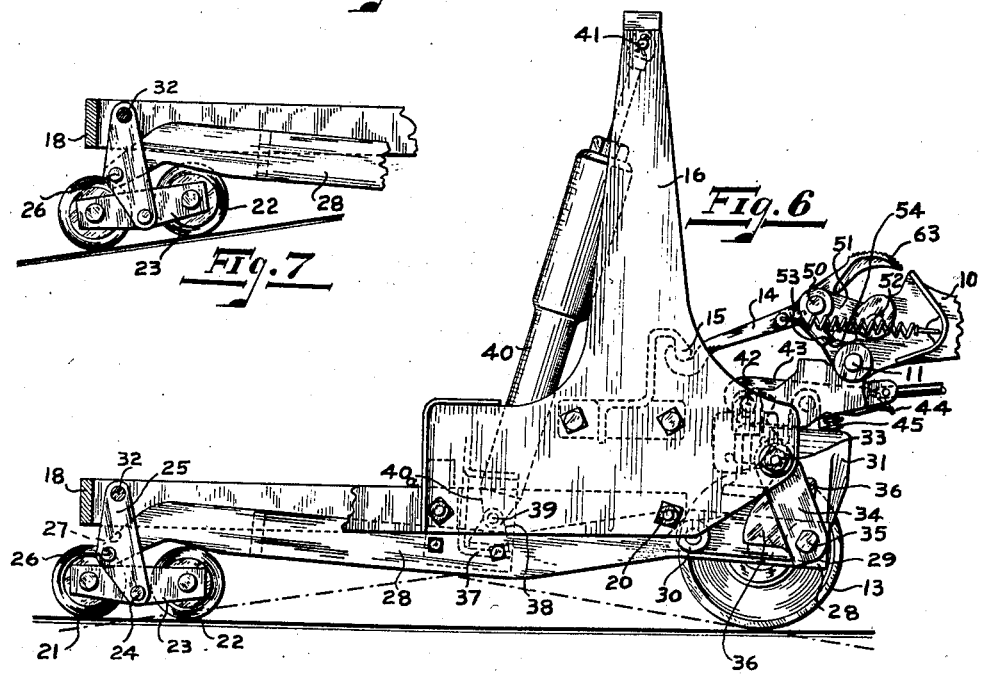

Patented Sept. 14, 1937

2,093,392

UNITED STATES PATENT OFFICE 2,093,392

LIFTING TRUCK

George Quayle, Philadelphia, Pa., assignor to The Yale & Towne Mfg. Co., Stamford, Conn., a corporation of Connecticut Application October 26, 1933, Serial No. 695,269
Renewed September 12, 1935

44 Claims. (Cl. 254—2)

This invention relates to hand lift trucks of the type in which an elevating platform on the truck is adapted to be lifted relatively to a main frame of the truck through the movement of a steering and lifting handle.

More particularly, my invention relates to a lifting truck of the general type indicated, in which the lifting movement of the elevating frame, will be accompanied by a lifting movement of the main frame relatively to which the elevating frame operates. It has been found, that it is very desirable to stack certain loads on very low skids, and sometimes on spacer blocks, allowing for but little room between the load and the floor, so that the elevating platform of the lifting truck must necessarily be relatively close to the floor in its initial unlifted position. It will be understood by those skilled in the art that if the elevating platform occupies an initial low position, the main frame which supports it, and relatively to which it is lifted, must also occupy a low position. When the main frame is built low so as to accommodate the particular desired arrangement of the elevating frame, it becomes impossible to move the truck over rough terrain, or ground which has considerable angularity, or over ramps or other devices which are used generally to allow the movement of trucks operating between a freight car and a freight station platform.

My invention overcomes this recognized difficulty by so arranging the main frame that it will lift relatively to the supporting wheels of the truck when the elevating frame of the truck is operated.

A particular embodiment of my invention will be described below and includes generally an elevating frame mounted relatively to a main frame, so that as the elevating frame is lifted, it will move the main frame simultaneously therewith, while itself moving relatively to that main frame, so that there is a double movement of the main frame and the elevating frame, and a relative movement between the two frames. Of course, this particular operation of my invention is shown in my preferred embodiment, but it will be readily understood by those skilled in the art that other arrangements of a main and elevating frame, where the main frame may be lifted before or after the elevating frame or during the movement of the elevating frame as in the present embodiment, will readily occur to those skilled in the art. I therefore believe myself entitled to a broad monopoly on a truck operating upon the general principles indicated and embodying variations of the particular structure that I shall describe below.

My invention contemplates also the arrangement of a lifting handle having a lifting member or hook pivotally arranged relatively thereto, the lifting member being adapted for cooperation with a lifting attachment associated with the elevating platform. It is the particular object of the invention to arrange the lifting hook or member carried by the lifting handle, and which may take various forms in various arrangements of lifting mechanisms, so that it will be balanced into or out of operative relation to the lifting mechanism as may be particularly desired. For instance, it is desirable in trucks of this type, that once an engagement is made between this lifting member and the lifting mechanism, this engagement remain effective until the lifting operation has been performed, since should the lifting engagement be broken accidentally, and the operator attempt to lift the load by applying his full weight to the lifting handle, he will be severely injured because this full application of his weight is not resisted by the lifting engagement indicated. Also, it is extremely desirable that once the lifting operation be completed, there be an automatic separation in the chain of lifting mechanism, so that should the load platform be accidentally released so that it moves to a lowered position, it will not operate to swing the handle with it, thus creating what is called in the trade, "a flying handle", which will injure severely anyone getting into its path.

It is a still further object of my invention to arrange for a steering and lifting lever which is counter-balanced in a particular manner and which is especially arranged so that once the elevating platform is lifted, it will receive an initial upward movement sufficient to cause a dis-engagement in the chain of lifting mechanisms, after which, a further counter-balancing spring will simply balance the weight of the handle so that it may be moved to any particular position desired by the operator thereof. Other detailed objects of the invention will naturally appear in the specification below.

For a further description of my invention, I shall now refer to the drawings, wherein Fig. 1 illustrates a particular type of hand lift truck embodying the various features of my invention. I have illustrated in Fig. 1 a tin plate truck, but it will be readily understood by those skilled in the art that the various principles of operation of the invention are readily applicable to many different types of elevating trucks embodying the general principles of operation which will be disclosed herein. Fig. 2 illustrates the lifting and steering lever in two of its positions and the corresponding positions of the lifting hook and the counter-balancing springs. Fig. 2a illustrates the parts of Fig. 2 in a slightly different position and more especially indicates guide means for the lifting hook. Fig. 3 illustrates a still further position of the parts of Fig. 2.

Fig. 4 is a top view of the rear assembly of Fig. 5 which is itself an elevational view of the lifting truck of Fig. 1 showing some of the parts in section and illustrating the arrangement of the main and lifting frame mechanisms. Fig. 6 is a view similar to Fig. 5 but showing the parts in elevated position and illustrating the movement which may be imparted to the main and elevating frames. Fig. 7 is a view of the rear end assembly of Fig. 6 showing the rear wheels as they are positioned when the truck is moving upgrade or over a particular obstruction.

Referring now more particularly to the drawings and especially Figs. 1 and 4 to 7 inclusive, my truck embodies a usual type of lifting lever 10 pivoted at point 11 to a steering head 12 having a steering post 12a which supports the front axle carrying the load steering wheels 13. The steering lever 10 is adapted to actuate a lifting hook 14 which cooperates with the lip 15 of the elevating frame 16 for transmitting lifting motion to that elevating frame. The particular elevating frame disclosed in this application is adapted for operation with tin plate and has an apron 17 adapted to assist in the stacking of the tin plate on the load supporting portion of the elevating frame. This load supporting portion comprises the members 18 and 19 which are U shaped and extend forwardly so as to be connected by bolting or welding to the forward portion 20 of the elevating frame 16. This general arrangement of the steering and lifting lever 10, the hook 14, the elevating lip 15, the supporting and steering wheel 13 operated by the steering head 12, is all well known and is of the general type disclosed in the patent to Stuebing 1,750,289 which is owned by the Yale & Towne Mfg. Company to which this application is assigned. I shall now describe my invention, which relates to certain additions to the general arrangement indicated in Fig. 1.

The rear end of the truck is supported by two pairs of load supporting wheels 22, each pair being mounted on beam members 23 which in turn are pivoted at 24 to link members 25. Viewing especially Figs. 4, 5 and 6, it will be quite obvious that for each pair of load supporting wheels 21 and 22 there are a pair of beam members 23, a pair of pivots 24 and a pair of link members 25. The link members 25 are then pivoted at 26 to the rear ends 27 of the main frame members 28, there being two of these main frame members for each side of the truck, or for each of the U members 18 and 19 of the elevating frame 16. These members are adapted to extend forwardly and to be bolted or welded at 29 and at 30 to the front beam or head 31 of the truck so as to form an integral main frame therewith.

The U members 18 and 19 which are actually rearward integral extensions of the front portion 20 of the elevating platform 16, are each pivoted at 32 to the link members 25 so as to be operated with those link members relatively to the beam 23, and supporting wheels 22, as will be indicated presently. The front end 20 of the elevating frame 16 is pivoted at 33 on each side thereof to the parallel links 34 which are in turn pivoted at 35 to the main frame and are adapted to be guided by the lugs 36 in supporting relation to the main frame.

An angle member 37 is bolted to the main frame and carries thereon the ear 38 which is in turn pivoted at 39 to the ear 40a which in turn supports one end of a liquid check 40 supported at its other end at point 41 on the upward extension of the elevating frame 16. The operation of the liquid check is well known in the art and is adapted merely to resist the downward movement of the elevating frame 16 when it is released after being fully lifted.

Fig. 5 illustrates rather clearly the initial position of the main and elevating frames before they are operated to the fully elevated position best illustrated in Fig. 6. It will be quite apparent that in the position of Fig. 4, the rearward portions 27 of the main frame members 28, are in a fully downward position so that both the main frame and the elevating frame are extremely close to the ground and so that a load spaced relatively close to the ground may be entered under as will be understood by those skilled in the art. When it is desired to elevate the frame 16, the hook 14 is merely engaged with the lip 15 so that downward movement of the steering and lifting lever 10 will act to pull the elevating frame 16 forwardly and to the right as illustrated in Fig. 5.

This movement will cause the elevating frame to ride up relatively to the front beam or head 31 of the main frame, due to the linkage arrangement of the front links 34. Simultaneously, the main frame, through its pivotal connections at 32, will be adapted to elevate itself relatively to the beam members 23 to which the links 25 are pivoted at 24. This movement is clearly illustrated in Fig. 6. The main frame members 28, whose rearward extension 27 are pivoted at 26 to the lifting links 25 will also partake of this link movement so as to move from the initial low position of Fig. 5 to the relatively high position of Fig. 6. The front portions of the main frame members 28 are initially spaced considerably from the floor and while they maintain their initial position, the rearward portions 27 move relatively to the floor, so that finally the entire main frame has considerable floor clearance. This movement will be accompanied by a slight tilting forward of the entire main frame and, therefore, of the front beam or head 31, but this movement will be slight and will not at all effect the operation of the elevating truck.

Fig. 7 merely illustrates the action of the rear wheels 21 and 22 should they meet some particular obstruction or should they encounter a grade condition.

In order to hold the elevating frame in its elevating position, usual means are provided in the form of a detent bar member 42 carried by the elevating platform and which cooperates with a holding hook 43 having a foot operated extension 44 and which is adapted to automatically engage the holding rod 42 due to the action of the spring 45, and which may be operated by depression of the pedal 44 to release the elevating frame for its automatic downward movement under the control of the liquid check 40 as will be understood by those skilled in the art.

I shall now describe the operation of the lifting lever 10 in conjunction with its operation of the lifting hook 14 which cooperates with the lip member 15 of the elevating frame, this construction being shown especially in Figs. 2, 2a and 3. The lifting hook 14, instead of being secured directly to the lifting lever 10, is pivoted instead at point 50 to a link member 51 which is in turn pivoted at 52 to the lifting lever 10. The link member 51 has a surface 53 which is cooperable with a similar surface 54 on the lifting lever 10 so that by operation of the lifting lever 10, it will be possible to contribute a compound lifting movement to the hook 14 as will be indicated presently, this compound movement being not, however, a part of my invention.

The lifting lever 10 is also equipped with a lug 55 best shown in Fig. 5 which cooperates with a surface 56 on the steering head 12. The purpose of this arrangement is to permit of an initial upright predetermined position of the handle 10, and so that there will be some fixed relation possible between the handle 10 and the lifting truck, so that the truck may be pushed backwardly as well as pulled forwardly by the handle 10. In this position of the elements, it is possible to make connection between the hook 14 and the lip member 15, so that downward movement of the handle will operate the lifting truck. This downward movement will pull the link 51, which in turn will pull the hook 14. It will be readily observed that this pulling motion will gradually change the relation between the hook 14, link 51, and lever 10, until finally, just before the parts reach the position illustrated in Figs. 3 and 6, the surfaces 53 of the link, and 54 of the steering lever will come into engagement and there will be a fixed movement of the link and lever. In this manner, a better distribution of the load lifting effort applied to the handle 10, is possible.

My invention embodies the particular operation of the spring 57 secured at point 58 to the lifting hook and at point 59 to the lifting lever. This spring is adapted to control the relation of the hook 14 to the lifting lever 10, and in order that this spring be not allowed to contribute a movement to the link 51 independently of the hook member 14, a guiding link member 60 is utilized and is particularly shown in Fig. 2a. This member 60 is pivoted at point 50 and has a slot 61 whereby it is mounted for sliding movement relatively to a pivot 62 carried by the steering head 12, and while it will permit a free rotary movement of the link member 51 relatively to the lifting lever 10, it will not permit the spring 57 to transmit an upward movement of the link member 51 together with the hook 14, as would be the natural tendency if the member 60 were dispensed with in Fig. 2a, for instance. It will, however, permit the spring 57 to operate on the hook 14, independently of its connection with the link 51. This independent application of the spring pressure to the hook 14, rather than to the combination of the hook 14 and its link 51, is important in the operation of the invention.

The action of this spring 57 relatively to the hook 14, is quite apparent from the drawings, in which it will be noted, and especially in Fig. 2, that when the hook is in its lower dotted line position, the spring is in a position illustrated by dash and dot lines as falling below the pivot point 50 of the hook on the link 51. The spring will, therefore, tend to maintain the hook 14 in its downward position and away from the lifting lip 15. Fig. 2a illustrates the same position of the parts of Fig. 2, but shows the control exercised by slotted link 60. When it is desired to place the hook 14 in engagement with the lip 15, it is merely necessary to step on the pedal 63 of the hook and move the hook against the action of spring 57, into its upward full line position of Fig. 2. Once the hook passes its dead center position relatively to its pivot point 50 on the link 51, the spring will act to force it upward into engagement with the lip 15 and will maintain it in engagement thereafter.

As the lifting lever 10 moves downwardly from the position of Fig. 2 to the fully raised or elevated position of the platform illustrated best in Fig. 3, it is quite apparent that the relation between the lifting lever 10, the link 51, and the hook 14, will gradually change until finally in the fully elevated position illustrated in Fig. 3, the hook will be so related to the lifting lever 10 that the spring 57 will tend to move the hook out of engagement with the lip 15 of the elevating platform. However, because of the lifting tension between the hook and the lip 15, the spring will be ineffective during such time as the platform is in a position intermediate its lowered position and its fully elevated position. Once the platform is elevated and in maintained in elevated position by the action of the detent member 43, any reverse movement of the lifting lever from the fully elevated position to the dotted line position illustrated in Fig. 3, will tend immediately to relieve the tension between the lip 15 and hook 14, so that the spring 57 will be free to move the hook 14 to the downward dotted line position of Fig. 3 wherein it will be maintained free of the lip 15 until connected again as illustrated in full lines in Figs. 2 and 5.

In order to insure the release of the lifting lever and its hook 14 from the lip 15, and in order to counterbalance the lever 10, I prefer to utilize the checking and counterbalancing mechanism best illustrated in Figs. 2 and 3. This mechanism comprises an ear 65 secured to the lifting head 12 and to which is pivoted the rod 66. This rod carries a washer member 67 which operates in a hollow tube member 68 and acts to compress a spring 69 therein, which spring is of relatively light resistance. At the end of spring 69 there is a further disc 70 upon which rests the end of the relatively hard spring 71 secured at its other end at point 72 to a block member 73 closing the end of the tube 68 and secured in turn at 74 to the lifting handle 10.

The mechanism is so arranged that the relatively light spring 69 will in all normal positions of the handle 10, act to counterbalance the handle and to relieve the operator of the necessity of exerting the considerable effort necessary to maintain the handle in any desired position. The relatively strong spring 71 functions only in the position illustrated in Fig. 3, wherein the lever 10 is in a practically horizontal position and the elevating platform has been moved to its full upward position. The spring 71 will, therefore, resist the last increment of movement of the lifting handle 10, and because of its relatively great power, will immediately tend to force the lever 10 into its upward dotted line position illustrated in Fig. 3, as soon as the application of lifting force is removed from the lever 10. This will naturally tend to release the tension between the hook 14 and the lifting lip 15 immediately, and to allow the spring 57 to withdraw hook 14 from lip 15 and thus prevent the "flying handle".

I claim:

1. In a lifting truck, a main frame having a steering head, elevating means carried by said steering head, an elevating frame, means for mounting said elevating frame relatively to said main frame so that it may be lifted relatively thereto upon operation of said elevating means, and means whereby said main frame is elevated during lifting movement of said elevating frame.

2. In a lifting truck, an elevating frame, a main frame having a steering head, elevating means carried by said steering head, means mounting said elevating frame for lifting movement relatively to said main frame upon operation of said elevating means, and means whereby said mounting means permit elevating movement of said main frame while said elevating frame is being elevated.

3. In a lifting truck, an elevating frame, a main frame, supporting wheels for said main frame, a steering head on said main frame for steering certain of said supporting wheels, a steering and lifting lever on said head, means mounting said elevating frame for lifting movement relatively to said main frame upon operation of said lifting lever, and means mounting said main frame for elevating movement relatively to said supporting wheels.

4. In a lifting truck, an elevating frame, a main frame, supporting wheels for said main frame, a steering head for said main frame having a steering and lifting lever, means mounting said elevating frame for lifting movement relatively to said main frame upon operation of said steering and lifting lever, and means mounting said main frame for elevating movement relatively to said supporting wheels, said means being arranged to contribute simultaneous lifting movement of said main and elevating frames.

5. In a lifting truck, an elevating frame, a main frame having a steering head and a lifting and steering lever thereon, supporting wheels for said main frame comprising steering wheels operated by said head, means mounting said elevating frame for lifting movement relatively to said main frame upon operation of said steering and lifting lever, and means mounting said main frame for elevating movement relatively to said supporting wheels, said means being arranged to contribute simultaneous lifting movement of said main and lifting frames relatively to said supporting wheels, and of said elevating frame relatively to said main frame.

6. In a lifting truck, an elevating frame, a main frame, front and rear supporting wheels for said main frame, means mounting said elevating frame for lifting movement relatively to said main frame, and means mounting said main frame for elevating movement relatively to said rear supporting wheels while maintaining the front end in fixed relation to the front wheels, means for applying a lifting effort to said elevating frame, and means whereby said elevating frame when lifting applies lifting effort to said main frame whereby to effect simultaneous lifting of said main and elevating frames.

7. In a lifting truck, an elevating frame, a main frame, front and rear supporting wheels for said main frame, means mounting said elevating frame for lifting movement relatively to said supporting wheels, means for applying lifting effort to said elevating frame whereby to lift it through said mounting means, means mounting said main frame for lifting movement relatively to said rear supporting wheels while maintaining the front end in fixed relation to the front wheels, and means of connection between said elevating and main frames and their mounting means whereby lifting movement is imparted to said main frame through the mounting means of said elevating frame.

8. In a lifting truck, an elevating frame, a main frame, means mounting said elevating frame for lifting movement, front steering wheels, and rear supporting wheels for said main frame, means mounting said main frame for pivotal movement relatively to said rear supporting wheels whereby said frame may be lifted in a pivotal manner about the front wheels as an axis, and means for moving said main frame about its pivotal mounting operable when lifting effort is applied to said elevating frame.

9. In a lifting truck, an elevating frame, a main frame having a front cross member and a lifting lever mounted thereon, supporting wheels for said truck, elevating mechanism connected with said supporting wheels and main and elevating frames and operable by said lifting lever, and means whereby said mechanism is operable to elevate said main and elevating frames simultaneously relatively to said supporting wheels.

10. In a lifting truck, an elevating frame, a main frame having a front cross member and a lifting lever mounted thereon, supporting wheels for said truck, elevating mechanism connected with said supporting wheels and main and elevating frames and operable by said lifting lever, and means whereby said mechanism is operable to elevate said main and elevating frames simultaneously relatively to said supporting wheels, while simultaneously elevating said elevating frame relatively to said main frame.

11. In a lifting truck, a main frame having supporting wheels and a front cross member, a steering and lifting lever mounted on said front cross member, an elevating frame, said frame being pivoted to said main frame for elevating movement relatively thereto, means whereby operation of said lifting lever will elevate said elevating frame, means of connection between the rear end of said main frame and its supporting wheels for elevating said main frame, and means whereby said means of connection are operable, as said elevating frame is elevated whereby to simultaneously elevate said main frame.

12. In a lifting truck, a main frame having front and rear supporting wheels, the supporting wheels at the rear end of said frame being so mounted relatively to said main frame as to permit elevating movement of said frame relatively to said wheels, the front end of said frame being in fixed relation to the front supporting wheels, an elevating platform mounted on said main frame, and means whereby said elevating platform is interconnected with the mounting means of the rear wheels on the main frame, so as to elevate said main frame as said elevating platform is itself elevated.

13. In a lifting truck, a main frame, front supporting wheels for said frame mounted about an axis fixed against vertical displacement relatively to said frame, rear supporting wheels for said main frame, an elevating frame, means mounting said elevating frame relatively to said main frame so that it may be lifted relatively to the main frame, and means whereby said main frame is elevated relatively to said rear supporting wheels during lifting movement of said elevating frame relatively to said main frame.

14. In a lifting truck, a main frame mounted on supporting wheels, an elevating frame, lifting means mounted on said main frame and adapted to lift said elevating frame, means mounting said elevating frame for lifting movement relatively to said main frame by said lifting means, and means for lifting said main frame on its supporting wheels during lifting of said elevating frame.

15. In a lifting truck, a main frame, front wheels supporting said main frame, rear wheels for said frame, rear link members connecting said rear wheels to said main frame, elevating platform also connected to said rear link members, forward links connecting said elevating platform only to said main frame, and means for moving said platform on said forward and rearward links whereby to lift the same.

16. In a lifting truck, a main frame, front wheels supporting said main frame, rear wheels for said frame, rear link members connecting said rear wheels to said main frame, elevating platform also connected to said rear link members, forward links connecting said elevating platform only to said main frame, means for moving said platform on said forward and rearward links whereby to lift the same relatively to said rear wheels and said main frame, and means whereby said main frame is elevated simultaneously relatively to at least said rear wheels through its connection with said rear link members.

17. In a lifting truck, an elevating platform, a lifting lever, a lifting hook operable by said lever, lifting means engageable by said lifting hook to elevate said platform, a spring connected to said hook and constantly urging it in one or another direction relatively to the lifting lever, said spring being adapted to occupy different positions relatively to said hook so as to urge it in one or another direction dependent upon the position of the hook relatively to the lever.

18. In a lifting truck, an elevating platform, a lifting lever, a lifting hook pivotally connected to said lever and operable therewith to elevate said platform, elevating means adapted to be engaged by said hook, and a spring adapted to urge said hook in a clockwise or counter-clockwise direction on its pivotal connection and into or out of engagement with said elevating means depending upon the relation of said lifting lever and its hook.

19. In a lifting truck, an elevating platform, elevating means for said platform, a lifting lever, a lifting hook pivotally connected to said lifting lever and adapted for engagement with said elevating means, said lifting hook being rotatable on its pivot means and adapted to be moved manually about said pivot means, and spring means for urging said hook in one or another direction about its pivot depending upon its relation to its pivot means.

20. In a lifting truck, an elevating platform, elevating means for said platform, a lifting lever, a lifting hook pivotally connected to said lifting lever and adapted for engagement with said elevating means, said lifting hook being rotatable, and adapted to be moved about its pivot as it is being operated with the lifting lever to elevate said elevating platform, and spring means urging said hook in one or another direction about its pivotal mounting as its relation to said lifting lever changes.

21. In a lifting truck, a lifting lever, an elevating platform, separable means of connection between said platform and lever whereby depression of said lever will elevate said platform, a part of said means being pivotally mounted relatively to said lever, and spring means urging said part out of or into connected relation with the other of said means of connection depending upon the angular position said part occupies relatively to said lever.

22. In a lifting truck, a lifting lever, an elevating platform, separable means of connection between said platform and lever whereby depression of said lever will elevate said platform, a part of said means being pivotally mounted relatively to said lever, and spring means urging said part out of or into connected relation with the other of said means of connection depending upon the angular position said part occupies relatively to said lever, and manual means for rotating the said part on its pivot into different angular positions relatively to the lever.

23. In a lifting truck, a lifting lever, an elevating platform, separable means of connection between said platform and lever whereby depression of said lever will elevate said platform, a part of said means being pivotally mounted relatively to said lever, spring means urging said part out of or into connected relation with the other of said means of connection depending upon the angular position said part occupies relatively to said lever, manual means for rotating the part on its pivot, said part being rotatable on its pivot also during lifting movement of said lever.

24. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable relatively to said lever so as to be spring pressed out of or into connection with said elevating means when said lifting lever is substantially vertical, depending on the will of the operator, said hook being adapted to occupy a position between said lever and platform lifting means wherein it is urged out of connection with said lifting means when the platform is elevated and the lever is substantially horizontal.

25. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable relatively to said lever so as to be spring pressed out of or into connection with said elevating means when said lifting lever is substantially vertical depending upon the will of the operator, said hook being adapted to occupy a position between said lever and platform lifting means wherein it is urged out of connection with said lifting means when the platform is elevated and the lever is substantially horizontal, said hook being maintained in connection with said lifting means against said spring pressure so long as lifting effort is applied to said lever.

26. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable relatively to said lever so as to be spring pressed out of or into connection with said lifting means when said lifting lever is substantially vertical depending on the will of the operator, said hook being rotatable on its pivot so as to change its angular relation to the lever as the lever moves to a substantially horizontal position while imparting lifting movement to the platform through the intermediary of said hook, the final lifting position of said hook relatively to the final position of said lever being such that it is urged out of connection with said lifting means by said spring means.

27. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable relatively to said lever so as to be spring pressed out of or into connection with said lifting means when said lifting lever is substantially vertical depending on the will of the operator, said hook being rotatable on its pivot so as to change its angular relation to the lever as the lever moves to a substantially horizontal position while imparting lifting movement through the intermediary of said hook, the final lifting position of said hook relatively to the final position of said lever being such that it is urged out of connection with said lifting means by said spring means, said hook being maintained in connection with said lifting means and against said spring pressure so long as lifting effort is applied to said lever.

28. In a lifting truck, an elevating frame, a lifting lever, a lifting hook pivotally interconnected with said lifting lever, lifting means for said frame having a part adapted for engagement with said hook whereby to be operated by the usual downward lifting operation of said lever, said hook being adapted for manual movement about its pivot into and out of engagement with said elevating part, said hook being adapted also to rotate about its pivotal connection as it moves from an initial to a final position, and spring means for urging said hook into one or another direction about its pivot into an extreme position, the direction of said urging being dependent upon the relation of the hook to its pivotal mounting, said means being arranged so that when the lifting lever is in upward position with the elevating platform unlifted the hook will be urged initially into a position out of contact with the elevating part, said hook being then rotatable about its pivot to a point when it will be spring urged into continuous engagement with said elevating part, said hook being then adapted to change its relation to its pivot so that when the lifting lever is in a fully downward position and the elevating platform lifted, said hook will be spring urged into its initial downward position.

29. In a lifting truck of the type having a lifting handle adapted to be moved from a substantially vertical position to a lower position whereby to contribute a lifting effort, a comparatively light spring adapted to resist the downward movement of said handle so as to substantially balance the same, and a comparatively heavy spring adapted to resist the final movement of the lifting handle in its downward movement.

30. In a lifting truck of the type having a lifting handle adapted to be moved from a substantially vertical position to a lower position whereby to contribute a lifting effort, a comparatively light spring adapted to resist the downward movement of said handle so as to substantially balance the same, and a comparatively heavy spring adapted to resist the downward movement of the handle beyond a lower position corresponding substantially to the fully elevated position of said truck.

31. In a lifting truck of the type having a lifting handle adapted to be moved from a substantially vertical position to a substantially horizontal position, a sleeve like housing pivoted to said handle, a spring compressing member pivoted to the truck and slidable in said sleeve, a spring in said sleeve compressible by said member during part of the swinging movement of said lever, and a relatively heavier spring compressible by said member towards the end of the swinging movement of said lever.

32. In a lifting truck of the type having an elevating platform and a steering and lifting lever adapted to elevate said platform by movement in a vertical plane from an upper to a lower position, said truck having also detent means for maintaining the elevating platform in a fully elevated position upon its reaching that position, a comparatively light spring adapted to balance said handle during its movement from an upper to a lower position corresponding substantially to the fully elevated position of said platform, and a comparatively heavy spring adapted to resist the further movement of said lever from its position corresponding to the said fully elevated position.

33. In an elevating truck, a lifting lever, a link pivoted to said lever and adapted to rotate on said pivot during part of the lifting movement, a lifting hook pivoted to said link, and a spring between said hook and lever adapted to rotate the hook on its pivot in a clockwise or a counterclockwise direction depending on its angular relation to said lever.

34. In an elevating truck, a lifting lever, a link pivoted to said lever and adapted to rotate on said pivot during part of the lifting movement, a lifting hook pivoted to said link, a spring between said hook and lever adapted to rotate the hook on its pivot in a clockwise or a counterclockwise direction depending on its angular relation to said lever, and a guide member for said link to limit its rotation and to prevent its rotation about its pivot by said spring independently of said hook.

35. In a lifting truck, a lifting handle adapted to be moved in a vertical plane for contributing a lifting effort, a lifting hook pivotally connected to said lever through the intermediary of a link pivoted to the lever and itself carrying the hook on a pivot, said link and hook being adapted to change their relation relatively to said lifting lever during lifting movement of said lever, and a spring connected between said hook and lever and adapted to urge the hook in one or another direction relatively to the lever as its relation relatively to the lever changes.

36. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable relatively to said lever so as to be spring pressed out of or into connection with said lifting means when said lifting lever is substantially vertical depending upon the will of the operator, said hook being adapted to occupy a position between said lever and lifting means wherein it is urged out of connection with said lifting means when the platform is elevated and the lever is substantially horizontal, said hook being maintained in connection with said lifting means against said spring pressure so long as lifting effort is applied to said lever, and a relatively strong spring acting on said lever during its final movement and tending to impart a quick reverse movement thereto upon relief of lifting effort so as to release the hook from the lifting means.

37. In a lifting truck, an elevating platform having lifting means, a lifting lever, a lifting hook pivotally related to said lever and engageable with said lifting means for elevating said platform upon swinging movement of said lever from a substantially vertical position to a substantially horizontal position, spring means adapted to rotate said hook in a clockwise or in a counterclockwise manner about its pivot depending upon the angular position of the hook relatively to said lever, said hook being positionable to be spring pressed out of or into connection with said lifting means when said lifting lever is substantially vertical depending on the will of the operator, said hook being rotatable on its pivot so as to change its angular relation to the lever as the lever moves to a substantially horizontal position while imparting lifting movement through the intermediary of said hook, the final lifting position of said hook relatively to the final position of said lever being such that it is urged out of connection with said lifting means by said spring means, said hook being maintained in connection with said lifting means, however, and against said spring pressure so long as lifting effort is applied to said lever, and a relatively strong spring operating on said lever during its final movement and tending to impart a quick reverse movement thereto to release the hook when lifting effort is removed from said lever.

38. In a lifting truck of the type having an elevating platform and a lifting lever adapted to impart lifting movement to said elevating platform by movement in a vertical plane from a vertical position to a substantially horizontal position, and lifting means operable by said lever and comprising parts automatically disconnected upon relief of lifting pressure on said handle after the platform has been lifted, so as to prevent a "flying handle", that improvement which comprises the placing of a relatively strong spring where it must be compressed by the lever during the last part of its lifting movement, which spring acts to move said lever upwardly slightly immediately upon the relief of lifting pressure on said lever, whereby to release the parts of the lifting means to prevent a "flying handle".

39. In a lifting truck, an elevating platform, a lifting lever of the type adapted to operate elevating mechanism for the elevating platform during movement in a vertical plane from a vertical position to a substantially horizontal position, a lifting hook pivotally connected to said lever and operable thereby to elevate said platform, elevating means adapted to be engaged by said hook and to be automatically disengaged by said hook when the tension pressure between the hook and elevating means is relieved as when the elevating platform is fully elevated and the lifting lever is moved from its substantially horizontal position in a direction reverse to the lifting direction, and a spring acting to move said lifting lever in said reverse direction immediately upon the stopping of the application of lifting effort to said lever.

40. In a lifting truck, a main frame, front supporting wheels for said frame, longitudinally spaced wheels at each side of the rear of said main frame, said wheels being mounted on bar members, links pivoted to said bar members and also to said main frame, an elevating platform mounted for lifting movement relatively to said main frame, means for lifting said platform, and means of connection between said platform and said links whereby as said platform is lifted the links are actuated to raise the main frame relatively to the load wheels.

41. In a lifting truck, a main frame, front supporting wheels for said frame, longitudinally spaced wheels at each side of the rear of said main frame, said wheels being mounted on bar members, links pivoted at one end to said bar members and intermediately to said frame, an elevating platform mounted for lifting movement relatively to said main frame and pivoted to the other ends of said links, means for elevating said platform, said platform being effective while lifting to actuate said links to elevate said main frame also.

42. In a lifting truck, a main frame having supporting wheels, an elevating platform mounted for elevating movement relatively to said main frame, lifting means for elevating said platform relatively to said main frame, means connecting said platform to said lifting means for lifting said platform, and for thereafter disconnecting said lifting means to allow said platform to move to its lowered position independently of said lifting means, means for locking said platform to said main frame after it has reached an elevated position relatively thereto, means for elevating said main frame relatively to its supporting wheels, said platform locking means being effective also to lock said main frame in its elevated position.

43. In a lifting truck, a main frame having supporting wheels, means mounting said main frame for elevating movement relatively to said supporting wheels, an elevating platform, means mounting said platform for elevating movement relatively to said main frame and also relatively to said wheels, lifting means for so elevating said platform and releasable from said platform to allow it to move to a lowered position independently of said lifting means, means whereby said main frame and said platform are elevated together by said lifting means, and a check between said main frame and said platform for cushioning the downward movement of said platform relatively to said main frame when lowered independently of said lifting means, and also of said main frame relatively to its supporting wheels.

44. In a lifting truck, a main frame having supporting wheels, means mounting said main frame for lifting movement relatively to said supporting wheels, an elevating platform, means mounting said platform for elevating movement relatively to said main frame and also relatively to said wheels, lifting means for so elevating said platform and releasable from said platform to allow it to move to a lowered position independently of said lifting means, means whereby said main frame and said platform are elevated together by said lifting means, means of connection between said platform and frame whereby they are elevated simultaneously relatively to the supporting wheels and relatively to one another and are similarly lowered, and a check between said main frame and said platform for cushioning the downward movement of said platform relatively to said main frame when lowered independently of said lifting means, and also of said main frame relatively to said supporting wheels.

GEORGE QUAYLE.